Dec. 8, 1936.  E. W. MILLER  2,063,262
VARIABLE DRIVING MECHANISM
Filed Oct. 9, 1933  2 Sheets-Sheet 1
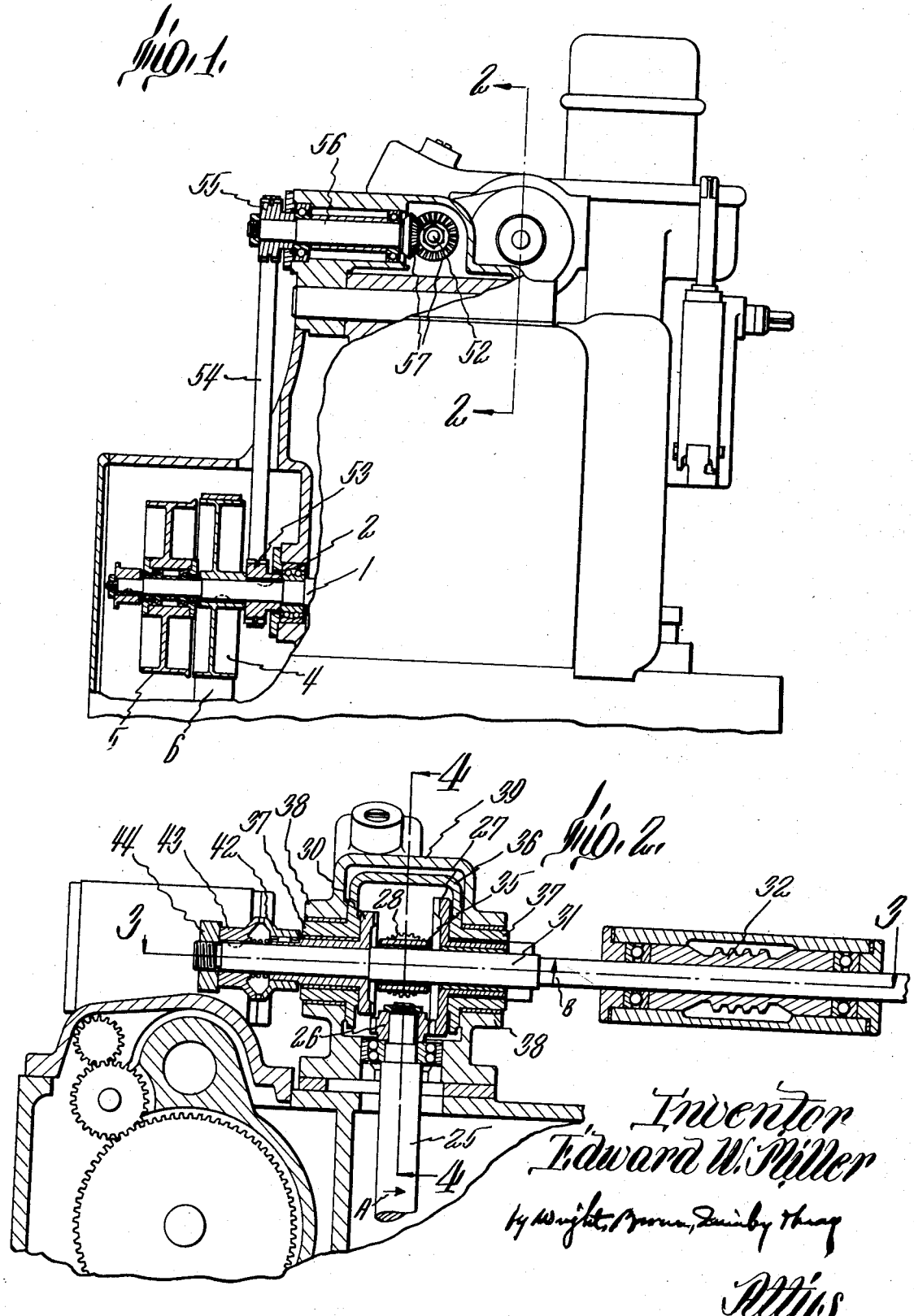
Inventor
Edward W. Miller Dec. 8, 1936.　　　　E. W. MILLER　　　　2,063,262
VARIABLE DRIVING MECHANISM
Filed Oct. 9, 1933　　　2 Sheets-Sheet 2
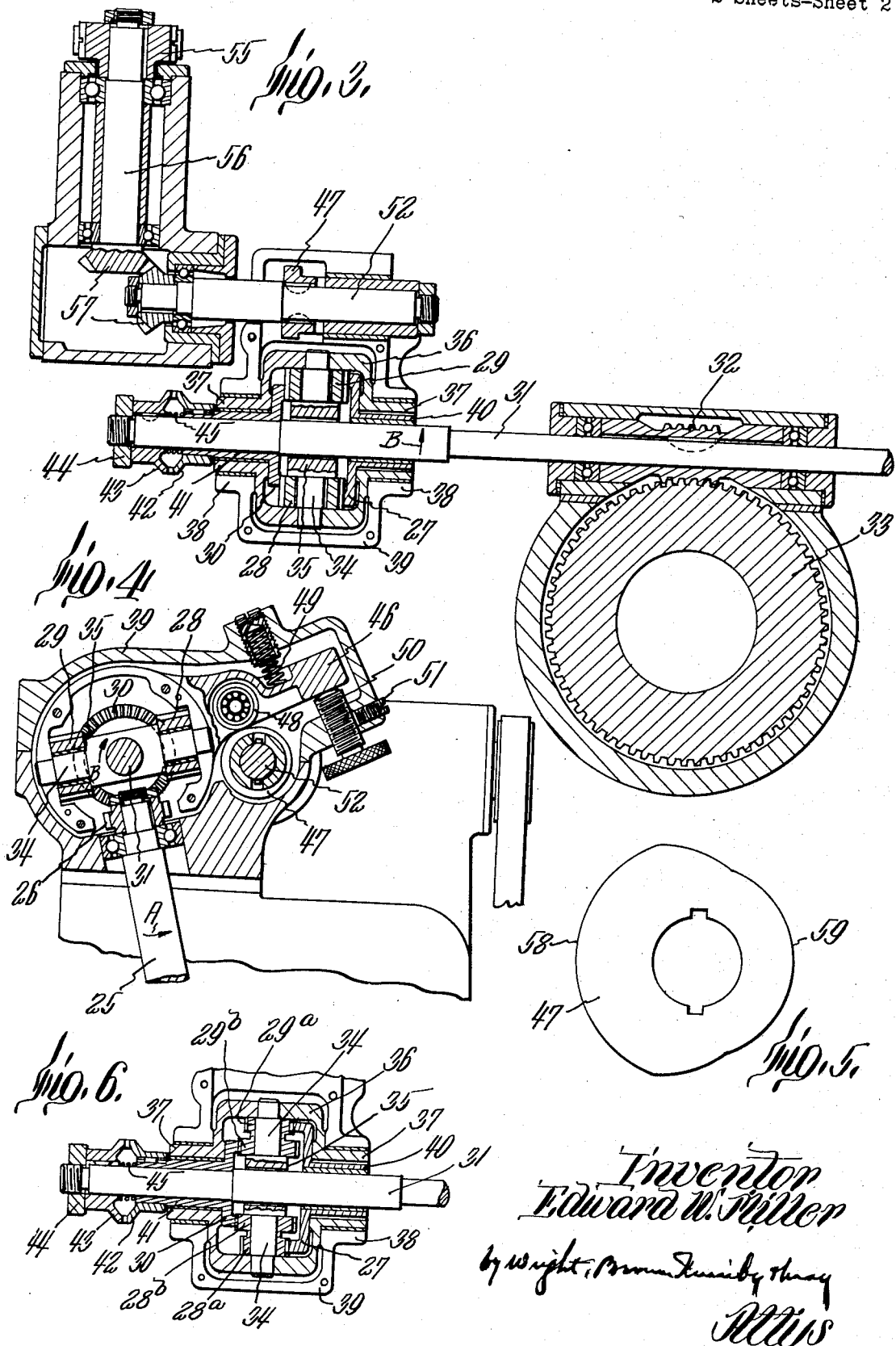
Inventor
Edward W. Miller Patented Dec. 8, 1936

2,063,262

UNITED STATES PATENT OFFICE 2,063,262

VARIABLE DRIVING MECHANISM

Edward W. Miller, Springfield, Vt., assignor to The Fellows Gear Shaper Company, Springfield, Vt., a corporation of Vermont Application October 9, 1933, Serial No. 692,802

7 Claims. (Cl. 90—9)

The present invention is related to that disclosed in my Patent No. 1,802,181, of April 21, 1931, entitled Gear generating machine; and it is more particularly related to means for giving the cutter incremental movements of rotation in addition to the progressive rotation which results in generation of tooth forms in the gear being cut. In the machine of said prior patent, a gear shaper cutter of the Fellows type is reciprocated in the direction of its axis, and also rotated about its axis, while the work piece is harmoniously rotated about a different axis as though it were a gear running in mesh with a conjugate gear corresponding to the cutter. In addition the cutter is given incremental angular movements about its axis, at times in the same direction as its generative rotation, and at other times in relatively the opposite direction. Such incremental movements, made at appropriate times in appropriate directions, enable the cutter teeth to avoid rubbing contact with the work on the return stroke, and to cut spaces in the work wider than their own width.

The object of the invention is to furnish an improved and simplified means for imparting movements of the character above described to a gear shaper cutter in the environment indicated. Whereas in the prior machine the incremental angular movements are effected by shifting endwise a worm in mesh with a worm wheel connected with the cutter spindle, while the generating rotation of the cutter is caused by rotation of the worm, in the present invention both the progressive rotation and the incremental oscillations are effected by rotation only of the corresponding worm; the latter being rotated at a variable speed with increments of angular movement superposed in relatively opposite directions upon its progressive rotation.

In its broader aspects the invention is not limited to combination with a gear shaping machine or to the specific purposes above mentioned, but comprises a mechanical movement embodying the novel principles hereinafter described, for all purposes to which the same is applicable, and whether the element so rotated with variable angular velocity is a worm or any other element of machinery to which variable angular velocity may be usefully imparted. In its present embodiment the mechanism includes a planetary gearing with driving and driven sun gears, and means for angularly moving the planet gears about their axis of revolution alternately in opposite directions; such shifting of the planet gears imparting to the driven sun gear positive and negative increments of rotation additional to the progressive rotation imparted by the driving sun gear.

Referring to the drawings, in which the principles of the invention are illustrated by reference to a concrete embodiment,—

Fig. 1 is a side elevation, with parts broken away and shown in section, of the upper part of a gear generating machine similar in principle to that disclosed in my prior Patent 1,802,181;

Fig. 2 is a vertical section of the same part of the machine taken on line 2—2 of Fig. 1;

Fig. 3 is a horizontal section taken on line 3—3 of Fig. 2;

Fig. 4 is a vertical section taken on line 4—4 of Fig. 2;

Fig. 5 is a detail elevation of one form of cam by which the incremental oscillation is imparted and controlled;

Fig. 6 is a detail view of a modified form of planetary gearing.

Like reference characters designate the same parts wherever they occur in all the figures.

The reference numeral 1 designates the main driving shaft of a gear shaping machine which turns in suitable bearings 2, (only one of which is shown here), and carries fast and loose pulleys 4 and 5 respectively, either of which is adapted to take the driving belt 6. 25 designates a shaft which corresponds with the shaft so designated in my said prior patent and is driven by the shaft 1 through the intermediate gearing shown in said patent; or it may be driven by any other suitable means. Shaft 25 carries a pinion 26 which meshes with a crown gear 27. This is the driving sun gear of the planetary gearing referred to in the introductory part of this specification. Two planet pinions, 28 and 29, mesh with this driving gear and also with a driven sun gear 30. The latter is coupled with a shaft 31 which carries a worm 32 in mesh with a worm gear 33. This worm gear, in the gear shaping machine, is the so-called index wheel of the cutter, with which the cutter carrying spindle is coupled by means of guides which impart rotation to the spindle while permitting independent endwise reciprocation thereof. Such guides, as is well understood in the art, may be either straight or helical according as the machine is equipped to cut spur or helical gears.

The planetary gears are mounted on pivots 34 projecting from opposite sides of a block 35 through which shaft 31 passes, and the ends of the pivots are clamped between the halves of a two part carrier 36. The carrier has trunnion sleeves 37 protruding in axial alinement with one another from opposite ends, which are supported rotatably in bearings 38 in a housing 39 which is part of the frame structure. The upper half of the housing is separable from the lower half and is detachably bolted thereto.

The driving sun gear 27 has a hub 40 fitted rotatably in one of the trunnion sleeves 37, and within which the shaft 31 has a rotative bearing. The driven sun gear has a hub 41 fitted rotatably in the other tubular trunnion 37 and also surrounding the shaft. It may be fitted tightly, or keyed, to the shaft so as to drive the latter directly; but preferably it is fitted rotatably so as to permit angular adjustment of the shaft, and the drive is accomplished through clutch members 42, 43, the former of which is made fast to the protruding end of hub 41 and the other is splined to the shaft. A nut 44 screwed on the end of the shaft holds the clutch member 43 coupled with member 42 against the thrust of spring 45 and permits uncoupling of the clutch.

An arm 46 integral with one member of the planet gear holder 36 extends laterally into an extension of housing 39, and is engaged with a cam 47. Preferably it is provided with a ball-bearing roll 48 which serves as the cam follower or abutment. A spring 49 bears on arm 46 to press the follower against the cam and cause it to follow the receding parts of the cam circumference. A stop screw 50 passes through the housing at the opposite side of arm 46 from the spring, and serves as an adjustable stop to limit the extent to which the arm may follow recessions of the cam. It may be set so that the planet gear carrier will swing through the full distance permitted by the cam, or through any part of this distance. A set screw 51 is available to secure the stop screw in its adjustments.

It will be understood that while the details last described are suitable and efficient for the purpose, they may be substituted by a variety of other substantially equivalent means.

Cam 47 is keyed to a shaft 52 which is driven from main shaft 1 by a pulley or sprocket gear 53, belt or chain 54, a second pulley or sprocket gear 55, and a shaft 56 which carries the gear 55 and is coupled with shaft 52 by bevel gears 57.

It will be apparent that when the planet pinion carrier is stationary the shaft 31, and consequently the worm 32 and worm gear 33, are driven at a definite and uniform speed ratio with shaft 25, which is equal to the ratio between the gears 27 and 30. But when the planet pinions are moved angularly about the axis of shaft 31, which is their axis of revolution, then an increment of angular movement is superimposed on the normal rotation of shaft 31. Assuming that shaft 25 rotates in the direction of arrow A, then the normal rotation of shaft 31 will be in the direction of arrow B. When the planet pinions are displaced by a rise of the cam they tend to move the gear 30 in the opposite direction, giving it a negative increment of movement. Depending on the relative rapidity of this incremental movement, the resultant effect on the shaft may be to turn it momentarily oppositely to arrow B, or to make it stand still, or merely to retard its speed. The incremental movement caused by recession of the cam surface is a positive increment, which causes the shaft to turn faster in the direction of arrow B. Of course if shaft 25 turns in the opposite direction to that assumed, the incremental effect due to a rise of the cam is positive and that due to a descent is negative.

The cam 47 shown here for illustration has one rise and one descent, disposed oppositely to each other and connected by a high dwell 58 and low dwell 59. But a cam having more than one rise and descent, or one in which the total rise or the total descent is composed of a plurality of steps, may equally well be used. It may be driven at any desired speed ratio to the normal rotation of the cutter, for instance at a slow rate, and be designed to cause side-trimming cuts to be made after completion of a rough cutting cycle. In suitable situations a cam may be used which is positive in both directions.

The effect of this driving mechanism in gear shaping machines is to cause the cutter to be alternately accelerated and retarded in its rotation intermittently, with respect to a work piece rotating at constant speed, so that the teeth of the cutter are relieved of contact with the work during non cutting strokes, and/or brought into action alternately on opposite sides; according to the principles explained in my prior Patent No. 1,802,181.

Attention is directed to said prior patent for illustration of all necessary parts of a complete and operative gear shaping machine, including those of which illustration is omitted from these drawings for simplicity. In so far as necessary to support the appended claims, said prior specification is made a part hereof. In other situations where the essentials of this invention may be used, the driver may be run either continuously or intermittently.

It will be noted that by making the sun gears 27 and 30 of crown gear characteristics, and using spur gears as the planet pinions, I am able to substitute gears of different diameters for one another, thus making possible in very simple fashion variations in the speed ratio, which would not be possible, or not within such a wide range and in so many stages, if bevel gearing were used. In this particular illustration the driving sun gear is larger than the driven gear, causing a stepping up of the speed. But these gears may be of equal diameters, or the driving gear may be smaller than the driven gear, to step down the speed.

A modification of the planetary gearing designed to cause an additional stepping up of the speed, is shown in Fig. 6, where in place of the planet pinions 28 and 29 there are substituted pinions made with two steps, 28a, 28b, and 29a, 29b, respectively; the smaller elements 28a and 29a respectively of said pinions being in mesh with the driving sun gear 27, and the larger elements 28b and 29b meshing with the driven sun gear. Two steps of speed increase are thus provided. Here also the speed ratio may be made of any specific values within the ultimate limits, either of stepping up or stepping down, by substituting different appropriate gears.

The construction of planet carrier 36 and housing 39 facilitates the substitution of different gears for one another. Removal of the upper half of the housing enables the planet carrier to be removed and its parts disconnected and separated from one another, whereupon the gears may be changed.

The crown gear and spur pinion combination is preferable for other reasons of convenience also over bevel gearing. However, bevel gearing may be used in any situations where these advantages are not of moment. The principles of the invention may be employed also with planetary gearing of other specific characters, including those where the axes of the planet pinion are parallel, rather than perpendicular, to that of the sun gears.

What I claim and desire to secure by Letters Patent is:

1. A variable speed driving mechanism comprising two crown gears mounted to rotate upon the same axis and spaced apart axially with their tooth bearing sides directed toward one another, a spur pinion at one side of said axis in mesh with both crown gears, a pinion carrier oscillatively mounted on the same axis with the crown gears, a driving pinion in mesh with one of said crown gears, a cam organized to cause oscillation of the carrier, and means for rotating said last named pinion and cam in a prescribed timed relation with one another.

2. A variable speed driving mechanism comprising two gears mounted to rotate upon the same axis and spaced apart axially, each having a circular series of teeth on the side toward the other gear, one of which series of teeth is larger in diameter than the other, a two step planet pinion interposed between said sun gears having teeth on each step and arranged with the teeth of the smaller step meshing with the larger sun gear, and the teeth of the larger step meshing with the smaller sun gear, a carrier for said planet pinion mounted to oscillate about the same axis, and means for oscillating said carrier.

3. A variable speed driving mechanism comprising two gears mounted to rotate upon the same axis and spaced apart axially, each having a circular series of teeth on the side toward the other gear, one of which series of teeth is larger in diameter than the other, a two step pinion mounted between said sun gears at one side of the axis thereof and with its own axis perpendicular to the axis of the sun gear, the two steps of said pinion being in mesh respectively and exclusively with the different sun gears.

4. A transmission gear mechanism comprising two sun gears rotatably mounted on the same axis and being located with a space between them and their tooth-bearing sides facing toward one another, the teeth of one of said gears being arranged on a circumference of larger diameter than those of the other, an intermediate pinion mounted at one side of said axis with its own axis perpendicular thereto and having two toothed steps or zones of respectively different diameters, one of which meshes with the teeth of the larger crown gear exclusively and the other with the teeth of the smaller crown gear exclusively, means for driving one of said crown gears, and a driven shaft with which the other crown gear is coupled.

5. A gear assemblage comprising a two part housing having separated axially alined bearings and constructed with the separation plane between its parts substantially diametral with respect to said bearings, a planet gear carrier adapted to enter said housing between said bearings and having trunnions fitted rotatably to the bearings, said carrier being divided into two parts on a plane transverse to the axis of the bearings, two sun gears mounted within said carrier adjacent to the opposite ends thereof, having teeth on their inner faces and each having a hub rotatably fitted within the nearest one of the trunnions of the carrier, and a planet pinion held by said carrier between said sun gears with its teeth in mesh with the teeth of both sun gears and its axis perpendicular to the axis of the carrier and sun gears.

6. A gear assemblage comprising a two part housing having separated axially alined bearings and constructed with the separation plane between its parts substantially diametral with respect to said bearings, a planet gear carrier adapted to enter said housing between said bearings and having trunnions fitted rotatably to the bearings, said carrier being divided into two parts on a plane transverse to the axis of the bearings, two sun gears mounted within said carrier adjacent to the opposite ends thereof, having teeth on their inner faces and each having a hub rotatably fitted within the nearest one of the trunnions of the carrier, a planet pinion held by said carrier between said sun gears with its teeth in mesh with the teeth of both sun gears and its axis perpendicular to the axis of the carrier and sun gears, and a shaft passing coaxially through the hubs of both sun gears and being coupled nonrotatably with one of them and freely rotatable within the other.

7. In a gear generating machine having a rotatable and reciprocative cutter spindle, a worm wheel in splined driving connection with said spindle, a self locking worm in driving mesh with said worm wheel, and also having a main driving shaft; a differential driving mechanism for said worm comprising a driven sun gear in rotation transmitting connection with the worm, an independently rotatable driving sun gear and an intermediate planet pinion in mesh with both sun gears; mechanism driven from the main shaft for rotating said driving sun gear, a planet pinion carrier angularly movable about the axis of the sun gears having a protruding arm, a cam rotatably supported to impart angular movement to said carrier and thereby to the planet pinion around said axis, and driving connections between said main shaft and cam whereby the latter is driven in timed relation with the driving sun gear.

EDWARD W. MILLER.